UNITED STATES PATENT OFFICE.

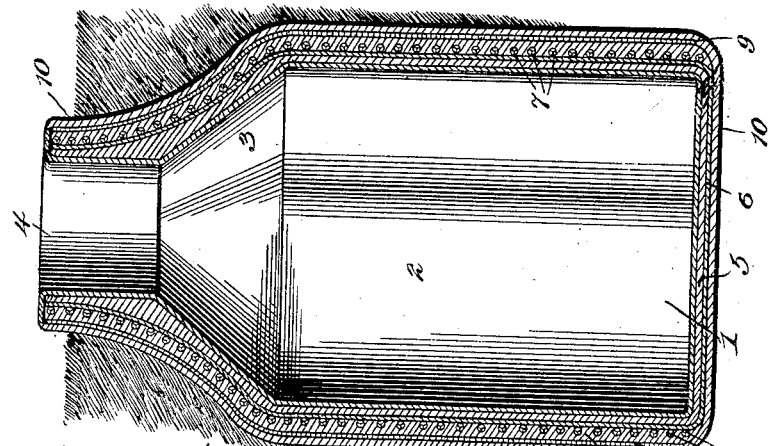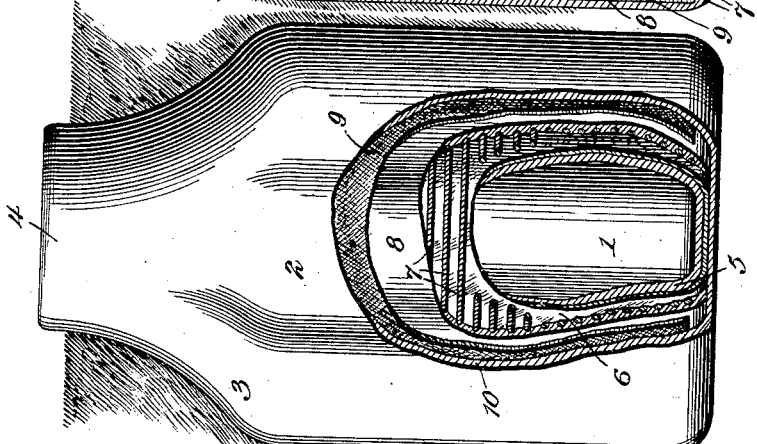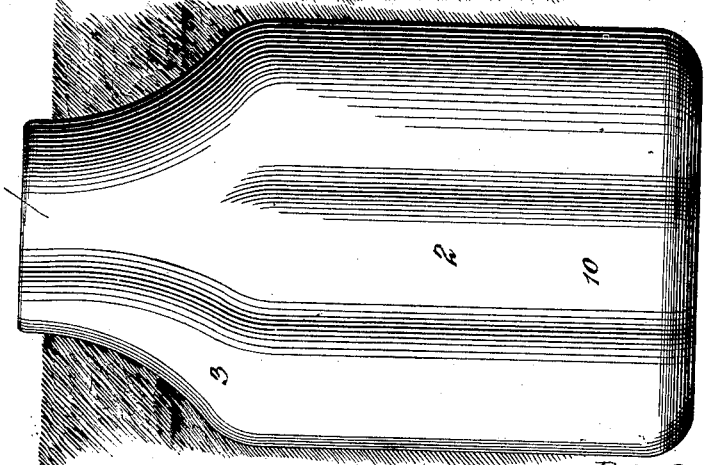

ROBERT P. STEWART, OF PARIS, TEXAS, ASSIGNOR OF ONE-HALF TO WILLIAM E. HOGUE, OF PARIS, TEXAS.

RECEPTACLE OR TANK.

SPECIFICATION forming part of Letters Patent No. 697,954, dated April 15, 1902.

Application filed October 14, 1901. Serial No. 78,578. (No model.)

*To all whom it may concern:*

Be it known that I, ROBERT P. STEWART, a citizen of the United States, residing at Paris, in the county of Lamar and State of Texas, have invented a new and useful Receptacle or Tank, of which the following is a specification.

My present invention relates to a novel method of producing a subterranean or buried receptacle or tank and to the product of the method.

In many localities, particularly in warmer climes, it is customary to provide underground tanks or receptacles for the storage of water and for other purposes, notably the storage of grain or fodder, in which case the receptacle is termed a "silo."

The object of my invention is to originate a novel method by the practice of which an underground tank of great durability and inexpensive construction may be produced.

A further object of the invention is to permit of the utilization of metal for the construction of the tank, the metallic receptacle being strengthened to resist the pressure upon its walls and protected from the corrosive action of the earth by a protective coating capable of being easily and inexpensively applied to a tank, either before or after the latter is placed in position in the ground.

To the accomplishment of these objects the method comprehends the several steps to be enumerated, and the product of the process embodies the structure illustrated in the accompanying drawings, and more fully hereinafter described.

In said drawings, Figure 1 is an elevation of my underground tank complete, the ground being shown in section. Fig. 2 is an elevation of the tank, showing the several layers of the coating broken away to illustrate the manner in which said coating is built up; and Fig. 3 is a central longitudinal section through the tank complete.

In practicing the method I first produce or procure a metallic tank or receptacle 1 of the proper dimensions, depending, of course, upon the purpose for which the same is intended. The tank preferably comprises a cylindrical body 2, having a trunco-conical or substantially dome-shaped top 3, open at its center and surmounted by a cylindrical upstanding neck-flange 4, coinciding with the opening through the top of the tank. The neck-flange 4 usually extends some distance above the ground, and the top 3, which is usually located below the surface of the ground and is covered with earth, is made of conical form in order to better resist the weight of the earth and to throw the strain of the superimposed weight upon the vertically-disposed side walls of the tank. A metallic tank of this character located underground will keep water or other contents cool and fresh for a long period; but it is obvious that the deleterious action of the ground upon the metal in contact therewith would quickly corrode and destroy the tank if unprotected. I therefore proceed to cover the entire exterior of the metallic tank or receptacle 1 with a coating of hot asphaltum, which material having withstood the action of the elements for ages is well calculated to protect the tank from the action of such elements as would effect the disintegration of the metal. This asphaltum layer (indicated by the numeral 5) is permitted to cool until it has become set to a certain extent and is sufficiently sticky or adhesive to adhere strongly to a layer of tarred-felt paper 6, with which the asphaltum layer is now covered. This paper layer, which may be either single or double or any greater extent, may or may not require a binder for the purpose of holding it in place during the application of a succeeding layer of asphaltum. If the edges of the paper lap to a considerable extent or if the paper is carried around the tank more than a single turn, a binder, while not absolutely necessary, is desirable, and for this purpose I wind the applied paper layer with a flexible strand 7—as, for instance, a cord. I next proceed with the application of a second asphaltum layer 8 and continue the application of asphaltum and tarred-felt paper alternately, according to the desired thickness of the protective coating. If, however, it is only desired to employ the two layers of asphaltum with the single intermediate layer of tarred-felt paper, the asphaltum layer 8 is preferably covered with a fabric covering 9, which serves to prevent the settling of the layer 8 during the cooling thereof and also serves to hold the final asphaltum layer 10, which is now spread over the fabric in the manner shown. The application of this final layer of asphaltum completes the method, and it should be noted that as the several layers of the protective coating are extended over the conical or dome-shaped top 3 and around the neck-flange 4 any tendency of said coating to sag will be effectually resisted.

The method as described is that preferably employed in the protection of the buried or underground receptacle; but certain of the steps enumerated may be omitted in some instances. For instance, the binding-strand 7 and the fabric 8 may or may not be employed, in accordance with the desires of the manufacturer and the character of the receptacle to be produced. The invention in its broad aspect comprehends the formation of a protective covering made up of alternate layers of asphaltum and tarred-felt paper, any number of such layers being employed, the first and last layers of the covering being composed of the asphaltum applied while hot and thereafter permitted to cool and harden.

From the foregoing it will be observed that I have produced a novel underground or buried receptacle comprising a metallic tank protected by a covering of novel form and applied in accordance with a novel method, said covering serving to render the tank absolutely air-tight and to resist the corrosion and consequent disintegration of the tank. I wish, however, to be distinctly understood as reserving to myself the right to vary the dimensions and contour of the receptacle, the number of layers of which the protective covering is composed, and to employ or omit the binding-strand and fabric, or either of them, provided only that such variations are properly embraced within the scope of the protection prayed.

What I claim is—

1. That method of producing an underground receptacle which consists in first applying a layer of hot asphaltum to the surface of a tank and permitting said layer to stand until it becomes partially set and adhesive, next applying a layer of tarred-felt paper to the asphaltum layer under sufficient pressure to effect an adhesive union therewith, and finally applying to the surface of the tarred-felt paper a second layer of hot asphaltum and permitting the same to set.

2. That method of producing an underground receptacle which consists first in applying a layer of hot asphaltum to the surface of a tank, and permitting said layer to partially set, next applying a layer of tarred-felt paper to the layer of asphaltum, next wrapping the tarred-felt paper with a binding-strand, and finally applying a second layer of asphaltum to the surface of the paper.

3. That method of producing an underground receptacle which consists first in applying a layer of hot asphaltum to a tank, and permitting said layer to become partially set, next applying a layer of tarred-felt paper to the asphaltum layer, next binding the tarred-felt paper with a flexible binding-strand, next applying a second layer of asphaltum to the surface of the bound paper, next applying a layer of fabric upon the asphaltum layer while the latter is in an adhesive condition, and next applying to the fabric a final layer of asphaltum.

4. That method of producing an underground receptacle which consists in applying alternate layers of asphaltum and tarred-felt paper to a tank, binding the tarred-felt paper layer or layers with a flexible binding strand or strands, applying a layer of fabric to the last layer of asphaltum, and finally applying an asphaltum layer to the outer surface of the fabric.

5. An underground receptacle of the character specified, comprising a tank equipped with a protective covering of asphaltum and tarred-felt paper, said paper being bound with a flexible binding-strand.

6. An undergound receptacle of the character specified, comprising a tank equipped with a protective covering composed of alternate layers of asphaltum and tarred-felt paper, a flexible binding-strand wound upon the layer or layers of tarred-felt paper, a fabric layer imposed upon the outer layer of asphaltum, and a final layer of asphaltum, covering the fabric.

7. That method of producing an underground receptacle which consists in applying alternate layers of asphaltum and tarred-felt paper to a tank, next applying a layer of fabric to the last layer of asphaltum, and finally applying an asphaltum layer to the outer surface of the fabric.

8. An underground receptacle of the character specified, comprising a tank equipped with a protective coating composed of alternate layers of asphaltum and tarred-felt paper, a fabric layer imposed upon the outer layer of asphaltum, and a final layer of asphaltum covering the fabric.

In testimony that I claim the foregoing as my own I have hereto affixed my signature in the presence of two witnesses.

ROBERT P. STEWART.

Witnesses:
BOB. CAMPBELL,
M. J. HATHAWAY.